United States Patent
Khan et al.

(10) Patent No.: US 11,874,752 B1
(45) Date of Patent: Jan. 16, 2024

(54) METHODS AND SYSTEMS FOR FACILITATING CYBER INSPECTION OF CONNECTED AND AUTONOMOUS ELECTRICAL VEHICLES USING SMART CHARGING STATIONS

(71) Applicant: King Saud University, Riyadh (SA)

(72) Inventors: Muhammad Khurram Khan, Riyadh (SA); Wazir Zada Khan, Wah Cantt (PK)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 18/124,473

(22) Filed: Mar. 21, 2023

(51) Int. Cl.
  *G06F 11/30* (2006.01)
  *B60L 53/66* (2019.01)
  *G06F 8/65* (2018.01)

(52) U.S. Cl.
  CPC .......... *G06F 11/3013* (2013.01); *B60L 53/66* (2019.02); *G06F 8/65* (2013.01); *G06F 11/3051* (2013.01)

(58) Field of Classification Search
  CPC .... G06F 11/3013; G06F 8/65; G06F 11/3051; B60L 53/66
  See application file for complete search history.

(56) References Cited

U.S. PATENT DOCUMENTS

| | | | |
|---|---|---|---|
| 8,798,852 B1 | 8/2014 | Chen et al. | |
| 11,093,596 B2 | 8/2021 | Kurian | |
| 11,146,401 B2 | 10/2021 | Miller et al. | |
| 11,271,971 B1* | 3/2022 | Khan | H04W 4/44 |
| 2018/0205754 A1* | 7/2018 | North | H04L 63/145 |
| 2021/0213846 A1* | 7/2021 | Sun | B60L 58/12 |

(Continued)

FOREIGN PATENT DOCUMENTS

WO   WO-2023011798 A1 *   2/2023

OTHER PUBLICATIONS

Daimi, Kevin, Securing Vehicle ECUs Update Over the Air, The Twelfth Advanced International Conference on Telecommunications, 2016, pp. 45-50.

(Continued)

*Primary Examiner* — Mohammad W Reza

(57) ABSTRACT

A method of facilitating cyber inspection of connected and autonomous electrical vehicles using smart charging stations. Accordingly, the method comprises receiving an information associated with a connected and autonomous electrical vehicle (CAEV) connected to a smart charging station, identifying an operation comprising a scanning operation based on the information, generating a request for facilitating the scanning operation comprising a cyber security threats scan, a cyber-attacks scan, an antivirus scan, an antimalware, an anti-ransomware, and a security scan, transmitting the request to a service provider device of a service provider comprising a cyber security provider, receiving a scanning operation information from the service provider device, performing the scanning operation on ECUs of the CAEV for facilitating the cyber inspection of the CAEV using the scanning information, generating a status of the CAEV based on the performing, transmitting the status to a device, and storing the status.

18 Claims, 20 Drawing Sheets

(56) References Cited

U.S. PATENT DOCUMENTS

2022/0394053 A1* 12/2022 Sorani ................ H04L 63/1433

OTHER PUBLICATIONS

Weimerskirch, Andre, Secure Software Flashing, SAE Int. J. Passeng. Cars—Electron. Electr. Syst., 2009, pp. 83-86, vol. 2, No. 1.
Howden, James, et al., The Security Aspects of Automotive Over-the-Air Updates, International Journal of Cyber Warfare and Terrorism, 2020, pp. 64-81, vol. 10, No. 2.

* cited by examiner

METHODS AND SYSTEMS FOR FACILITATING CYBER INSPECTION OF CONNECTED AND AUTONOMOUS ELECTRICAL VEHICLES USING SMART CHARGING STATIONS

FIELD OF THE INVENTION

Generally, the present disclosure relates to the field of data processing. More specifically, the present disclosure relates to methods and systems for facilitating cyber inspection of connected and autonomous electrical vehicles using smart charging stations.

BACKGROUND OF THE INVENTION

The field of data processing is technologically important to several industries, business organizations, and/or individuals. In particular, the use of data processing is prevalent for cyber inspection of connected and autonomous electrical vehicles.

The market of connected autonomous electrical vehicles (CAEV) is growing as the devastating effects of hydrocarbon emissions become well known. Today, more than a million CAEVs are on US roads, and will be projected to be 18 million by 2030. Connected autonomous electrical vehicles are becoming more common. Although CAEVs are the future of the transportation industry. However, cybersecurity challenges are also growing with CAEVs. Cyber security attacks are becoming more common as the technology in CAEVs is getting more advanced and thus, the risk of CAEVs hacking is on the rise. Connected autonomous electrical vehicles have the potential to increase the landscape of cyber threats. Moreover, the connected autonomous electrical vehicles and, in particular, applications and the ECUs of these vehicles are a source that can be leveraged to attack or at least cause some difficulties. Many characteristics of connected CAEVs are based on applications, firm-wares, and computer algorithms that are pre-programmed into various Electronic Control Units (ECUs). These ECUs are vulnerable to cyber-attacks. Cybercriminals can potentially put the CAEV driver's life at risk by jamming the vehicle control systems which leads to disabling brakes, turning off headlights, or taking over the steering. A connected but not updated electrical vehicle is a serious cybersecurity threat. So, in order to stay safe and secure, safety-critical systems in connected electric vehicles such as steering, accelerating, and braking which are software dependent must be updated to immediately address vulnerabilities. Also, the other ECUs, software, applications, and services in these connected CAEVs need regular upgrades and have to be updated from time to time so as to enhance software functionality and fix bugs and patch vulnerabilities.

Therefore, there is a need for improved methods and systems for facilitating cyber inspection of connected and autonomous electrical vehicles using smart charging stations that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating cyber inspection of connected and autonomous electrical vehicles using smart charging stations, in accordance with some embodiments. Accordingly, the method may include a step of receiving, using a communication device, at least one information associated with at least one connected and autonomous electrical vehicle (CAEV). Further, the method may include a step of identifying, using a processing device, at least one operation associated with the at least one CAEV based on the at least one information. Further, the method may include a step of generating, using the processing device, at least one request for facilitating the scanning operation based on the identifying and the at least one information. Further, the method may include a step of transmitting, using the communication device, the at least one request to at least one service provider device of at least one service provider associated with the at least one CAEV. Further, the method may include a step of receiving, using the communication device, at least one scanning operation information associated with the scanning operation from the at least one service provider device. Further, the method may include a step of performing, using the processing device, the scanning operation on the plurality of ECUs for facilitating the cyber inspection of the at least one CAEV based on the at least one scanning information. Further, the method may include a step of generating, using the processing device, a status associated with a cyber security health of the at least one CAEV based on the performing. Further, the method may include a step of transmitting, using the communication device, the status to at least one device. Further, the method may include a step of storing, using a storage device, the status of the at least one CAEV.

Further disclosed herein is a system for facilitating cyber inspection of connected and autonomous electrical vehicles using smart charging stations, in accordance with some embodiments. Accordingly, the system may include a communication device configured for receiving at least one information associated with at least one connected and autonomous electrical vehicle (CAEV). Further, the communication device may be configured for transmitting at least one request to at least one service provider device of at least one service provider associated with the at least one CAEV. Further, the communication device may be configured for receiving at least one scanning operation information associated with a scanning operation from the at least one service provider device. Further, the communication device may be configured for transmitting a status to at least one device. Further, the system may include a processing device configured for identifying at least one operation associated with the at least one CAEV based on the at least one information. Further, the processing device may be configured for generating the at least one request for facilitating the scanning operation based on the identifying and the at least one information. Further, the processing device may be configured for performing the scanning operation on the plurality of ECUs for facilitating the cyber inspection of the at least one CAEV based on the at least one scanning information. Further, the processing device may be configured for generating the status associated with a cyber security health of the at least one CAEV based on the performing. Further, the system may include a storage device configured for storing the status of the at least one CAEV.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
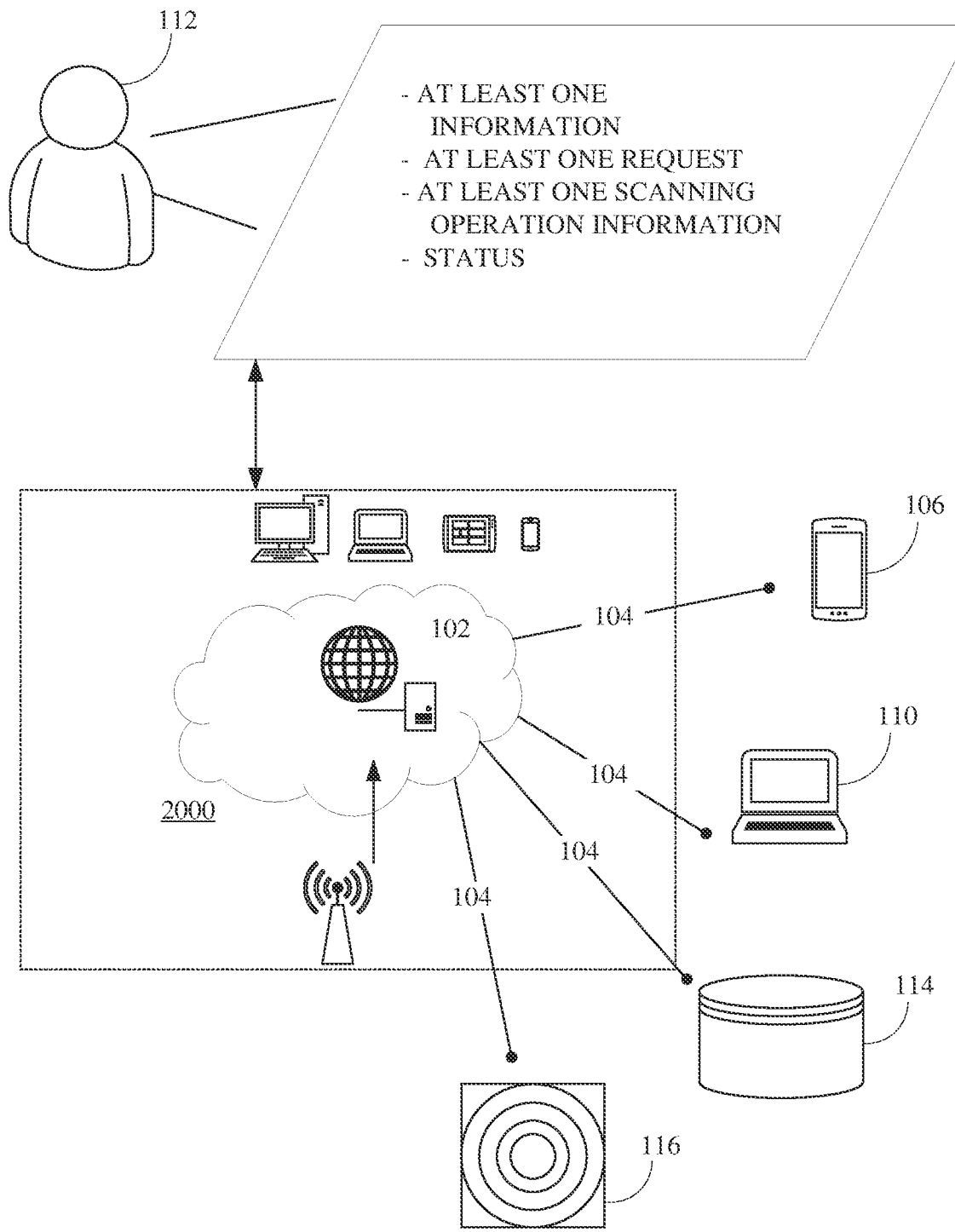
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems for facilitating cyber inspection of connected and autonomous electrical vehicles using smart charging stations, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods and systems for facilitating cyber inspection of connected and autonomous electrical vehicles using smart charging stations.

Further, the present disclosure describes a motor vehicle cyber inspection (MVCI) system for scanning cybersecurity threats of a connected and autonomous battery-operated electrical vehicle (CAEV) while charging. Further, the MVCI system may include an inspection system inside the CAEV as well as a smart charging station (SCS) for scanning cybersecurity threats of a connected and autonomous battery-operated electrical vehicle and notifying the operator (i.e., driver) through a smart display or any mobile device. Moreover, the MVCI system may include a scanning module responsible for scanning cyber threats like viruses, malware, ransomware, back doors, and trojan horse, and checking for security and data vulnerabilities of software and firmware of electronic control units (ECUs) by offering customers a list of different online cybersecurity companies and service providers through a module mounted on a charging station. Further, the system may include one or more processing devices and communication devices. It may also include a memory communicably coupled to one or more processing and storage devices for record-keeping and payment gateway for the cybersecurity services.

Further, the present disclosure describes systems and methods associated with improving cyber security through the use of charging stations of connected autonomous electrical vehicles. Since connected autonomous electrical vehicles are becoming more common, the connected autonomous electrical vehicles have the potential to increase the landscape of cyber threats. Moreover, the connected autonomous electrical vehicles and, in particular, applications and the ECUs of these vehicles are a source that can be leveraged to attack or at least cause some of the noted difficulties.

Further, the present disclosure describes systems and methods that relate to a manner of using smart charging stations to scan the connected autonomous electrical vehicle and subsequently check for cyber security threats while on charging. For example, while charging stations are normally used for charging electric vehicles but may be used in different ways, checking the vehicle for threats related to cyber security and scanning for viruses, malware, ransomware, back doors, trojan horse, software, security patches, and firmware updated for ECUs using different online cybersecurity companies and service providers, and so on.

Further, the present disclosure describes a motor vehicle cyber inspection (MVCI) system that may be inside a connected autonomous electrical vehicle (CAEV) for facilitating cyber inspection of the CAEV. Further, the MVCI may include an inspection system. The inspection system may include one or more processing devices and a memory communicably coupled to one or more processing devices (processors). The memory stores a connection module of the CAEV. The connection module includes instructions that when executed by the one or more processing devices cause the one or more processing devices to, in response to detecting the establishment of a connection between a CAEV and a smart charging station (SCS), determine attributes of the connection with the station. The attributes of the connection indicate a relationship between the CAEV and the SCS. The memory stores a scanning module including instructions that when executed by the one or more processing devices (processors) cause the one or more processing devices (processors) to scan the firmware of at least one electronic control unit (ECU) of a plurality of electronic control units (ECUs) associated with the CAEV. Further, a processing device of the one or more processing devices (processors) may be configured for determining a security update status for each ECU of the plurality of ECUs based on the applying. Further, the scanning module includes instructions that when executed by the one or more processing devices (processors) may cause the one or more processing devices (processors) to send a scan update status of the at least one electronic control unit (ECU) of the plurality of electronic control units (ECUs) associated with the CAEV to the scanning module of the charging station through the connection module. Further, the inspection system of the CAVE may include a storage device communicatively coupled with the processing device. Further, the storage device may be configured for storing the scan update status (security scan status) of the at least one electronic control unit (ECU) of the plurality of electronic control units (ECUs) associated with the CAEV.

Further, the present disclosure describes an inspection system inside a smart charging station (SCS) for managing and scanning for cyber security threats of connected autonomous electrical vehicles (CAEV). Further, the inspection system may include one or more processing devices and a memory communicably coupled to one or more processing devices (processors). The memory stores a connection module of the CAEV and includes instructions that when executed by the one or more processing devices cause the one or more processing devices to, in response to detecting the establishment of a connection between the CAEV and the smart charging station (SCS), determine attributes of the connection with the station. Further, the attributes of the connection indicate a relationship between the CAEV and the SCS. The memory stores a payment module including instructions that when executed by the one or more processing devices (processors) cause the one or more processing devices (processors) to receive information through a digital display related to cyber security services selected by the driver/owner of CAEV and automatically calculate the payment amount and make payment through any available payment methods. The memory stores a scanning module including instructions that when executed by the one or more processing devices (processors) cause the one or more processing devices (processors) to receive information from the scanning module of the CAEV through a connection module related to at least one electronic control unit (ECU) of a plurality of electronic control units (ECUs) associated with the CAEV. The scanning module of the SCS sends a request to the cybersecurity companies and service providers through a communication interface that is configured for transmitting a request for requesting cyber security threats scanning for the at least one electronic control unit (ECU) of the plurality of electronic control units (ECUs) associated with the CAEV. Further, the communication interface may be configured for receiving scanning instructions for the at least one ECU from the cybersecurity companies and service providers based on the transmitting of the request. The scanning module of the SCS may also send the request to the CAEV manufacturer server through the communication interface that is configured for transmitting a request for requesting security update or security patch for the at least one electronic control unit (ECU) of the plurality of electronic control units (ECUs) associated with the CAEV. Further, the communication interface may be configured for receiving at least one of a security update and a security patch for the at least one ECU from the CAEV manufacturer server based on the transmitting of the request. Further, the inspection module may include a processing device communicatively coupled with the communication interface. Further, the scanning module may be configured for generating a complete cyber security inspection report of the CAEV based on the determining. Further, the inspection system of the SCS may include a storage device communicatively coupled with the processing device. Further, the storage device may be configured for storing the cyber security inspection report. The inspection system may include the one or more processing devices and the memory communicably coupled to one or more digital displays mounted on the smart charging station, wherein the one or more digital displays may be coupled with the processing device. Further, the one or more digital displays may be configured for displaying at least one prompt and at least one alert. Further, a printing device mounted on the smart charging station may be coupled with the processing device, wherein the printing device may be configured for printing at least one cyber security inspection report, and a storage device communicatively coupled with the processing device. Further, the storage device may be configured for storing the cyber security inspection report.

Further, the present disclosure describes systems and methods for facilitating the scanning of cyber threats of a connected autonomous electrical vehicle (CAEV). Further, the disclosed system may include an inspection system inside a smart charging station (SCS). Further, the inspection system may include a communication interface configured for receiving a cybersecurity scanning request of at least one electronic control unit (ECU) of a plurality of electronic control units (ECUs) associated with the CAEV from at least one input device (i.e., smart display). Further, the cyber security scanning request may include at least one vehicle identifier associated with at least one CAEV. Further, the cyber security scanning request may include at least one electronic control unit (ECU) identifier associated with the at least one ECU. Further, the communication interface may be configured for transmitting a scanning request of the at least one electronic control unit (ECU) of the plurality of electronic control units (ECUs) associated with the CAEV to online cybersecurity companies or service providers. Further, the communication interface may be configured for receiving scanning instructions for scanning at least one ECU from the online cybersecurity companies or service providers based on the transmitting of the request. Further, the communication interface may be configured for transmitting a request for checking the available update of the at least one electronic control unit (ECU) of the plurality of electronic control units (ECUs) associated with the CAEV to a connected autonomous electrical vehicle (CAEV) manufacturer server. Further, the communication interface may be configured for receiving information of at least one of a latest available security update and a latest available security patch for the at least one ECU from the CAEV manufacturer server based on the transmitting of the request. Further, the inspection system inside the SCS may include a processing device communicatively coupled with the communication interface. Further, the processing device may be configured for identifying the at least one vehicle based on the at least one user identifier. Further, the processing device may be configured for authenticating the at least one user based on the identifying of the at least one user. Further, the processing device may be configured for identifying the at least one ECU based on the at least one ECU identifier. Further, the processing device may be configured for determining a cyber security status for each ECU of the plurality of ECUs based on the applying. Further, the processing device may be configured for generating the request for the scanning of the at least one ECU based on the identifying of the at least one ECU and the authenticating. Further, the transmitting of the request for the cyber security inspection of the at least one ECU may be based on the generating of the request. Further, the processing device may be configured for comparing of at least one of the (applied) security update and the (applied) security patch to the at least one ECU associated with at least one CAEV and received (available) security update and the (available) security patch to the at least one ECU from the CAEV server. Further, the processing device may be configured for analyzing and comparing the latest records with the newly available security patches (if any) with the timestamps. Further, the processing device may be configured for generating a cybersecurity inspection report of the CAEV based on the determining. Further, the inspection system inside SCS may include a storage device communicatively coupled with the processing device. Further, the storage device may be configured for storing the cyber security inspection report.

Further, the present disclosure describes systems and methods that relate to a manner of using smart charging stations to scan the connected autonomous electrical vehicle for cyber threats like viruses, malware, ransomware, back doors, trojan horse, and so on, and subsequently check for the updated security patches for software and firmware of the vehicle (CAEV) while on charging (connection established). For example, charging stations may be normally used for charging electrical vehicles but may be used in different ways, checking the available security updates for software and firmware of the electrical vehicle and scanning for viruses and malware infections, and so on. These electric vehicles may spend more time while driving or being parked in a parking garage at a residence or at a parking lot of a shopping mall during this time scanning such vehicles for any cybersecurity-related threat or the overall cyber security inspection might face notable difficulties like availability of reliable system with high-speed internet and required cyber security scanning services.

Further, some drivers may get concerned when presented with the idea of scanning their CAEV while charging from different charging stations available at different locations within a particular city or outside the city to support the functions described herein, such concerns are generally without cause and are alleviated through the disclosed charging without scanning or selecting same scanning service providers and/or benefits of getting informed about the overall cyber security inspection status of their CAEV as described. In either case, the time during charging may be utilized for scanning CAEV and saving time for getting the same services after scheduling a visit to a specialized customer service center, and so on.

Further, the present disclosure describes a motor vehicle cyber inspection system for scanning cyber security threats of a connected and autonomous battery-operated electric vehicle using a smart charging system. may include one or more processing devices. Further, a connection module of the connected autonomous battery-operated EV and the charging station may include instructions that when executed by the one or more processing devices cause the one or more processing devices to, in response to detecting the establishment of a connection between a connected and autonomous battery operated electric vehicle (EV) and a smart charging station (CS), determine attributes of the connection with the station that may indicate at least a relationship between the connected and autonomous battery operated electric vehicle and the smart charging station. Further, a scanning module of the electric vehicle may be configured for scanning cyber threats like viruses, malware, ransomware, back doors, trojan horse, and software and checking for the updated security patches installations of software and firmware for ECUs using different online cybersecurity companies and service providers and forwards it to the scanning module of the charging station. The scanning module of the charging station may be configured for analyzing the information received from the scanning module of the connected autonomous electrical vehicle, comparing it, and generating the cyber security inspection report of the connected autonomous battery-operated EV. Further, a memory may be communicably coupled to the one or more processing and storage devices. Further, a digital display may be mounted on the smart charging station. Further, the digital display may be coupled with the processing device. Further, the digital device may be configured for displaying the at least one prompt and the at least one alert. Further, a communication interface may be configured for transmitting a request for scanning software and firmware of an electronic unit (ECU) for cyber security threats from an online cybersecurity company or cyber security service provider's server. Further, a communication interface may be configured for transmitting a request for a latest available security and firmware update version of an electronic unit (ECU) from the manufacturer server of a connected and autonomous battery-operated electric vehicle. Further, a printing device may be mounted on the smart charging station. Further, the printing device may be coupled with the processing device. Further, the printing device may be configured for printing at least one cyber security inspection report. Further, a storage device may be communicatively coupled with the processing device. Further, the storage device may be configured for storing the cyber security inspection report. Further, the scanning module of the connected autonomous battery-operated EV may be configured for collecting information from all the ECUs and forwarding it to the scanning module of the charging station. Further, the scanning module of the connected autonomous battery-operated EV is configured for scanning all the ECUs and forwards the scanning report to the scanning module of the charging station. Further, the scanning module of the smart charging station may be configured for receiving the information about the scanning of all ECUs from the scanning module of CAEV and analyzing the information received. It first checks for the latest available virus signature files by sending a request to online cybersecurity companies or cybersecurity service providers' servers. It then starts scanning the software and firmware of ECUs by analyzing and comparing the received information from the cyber security service provider's server. Further, the scanning module of the smart charging station may be configured for receiving the information about all the ECUs from the scanning module of CAEV and analyzing the information received. It first checks for the available security patches and firmware updates by sending a request to the manufacturer. It then analyzes and compares the received information from the manufacturer and information about the ECUs of the connected autonomous electrical vehicle.

Further, the connection module of the connected autonomous better operated (CAEV) and the smart charging station (SCS) include instructions to detect the establishment of the electrical connection including instructions to detect a charging cable of the connected autonomous battery-operated CAEV being connected with a connector of the SCS.

Further, the connection module wherein include includes instructions to determine the attributes including instructions to identify the physical characteristics of the connection and policy characteristics of the connection.

Further, the payment module in the SCS includes an online payment method for the scanning of the connected autonomous battery-operated CAEV and generating the motor vehicle cyber inspection report of the CAEV.

Further, the MVCI system may include an inspection system inside the CAEV as well as a smart charging station (SCS) for scanning cybersecurity threats of a connected and autonomous battery-operated electrical vehicle and notifying the operator (i.e., driver) through a smart display or any mobile device. Moreover, the system may include a scanning module responsible for scanning cyber threats like viruses, malware, ransomware, back doors, trojan horse, and software and checking for the updated security patches installations of software and firmware for ECUs using different online cybersecurity companies and service providers.

Further, the present disclosure describes a system and method for using a charging station to scan/inspect the cybersecurity-related threats of a connected and autonomous battery-operated electrical vehicle (CAEV), more specifically, scanning cyber threats like viruses, malware, ransomware, back doors, trojan horse, software and checking for the updated security patches installations of software and firmware for ECUs using different online cybersecurity companies and service providers while charging.

FIG. 1 is an illustration of an online platform 100 consistent with various embodiments of the present disclosure. By way of non-limiting example, the online platform 100 to facilitate cyber inspection of connected and autonomous electrical vehicles using smart charging stations may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, connected and autonomous electrical vehicle users, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 2000.

Figure 2:
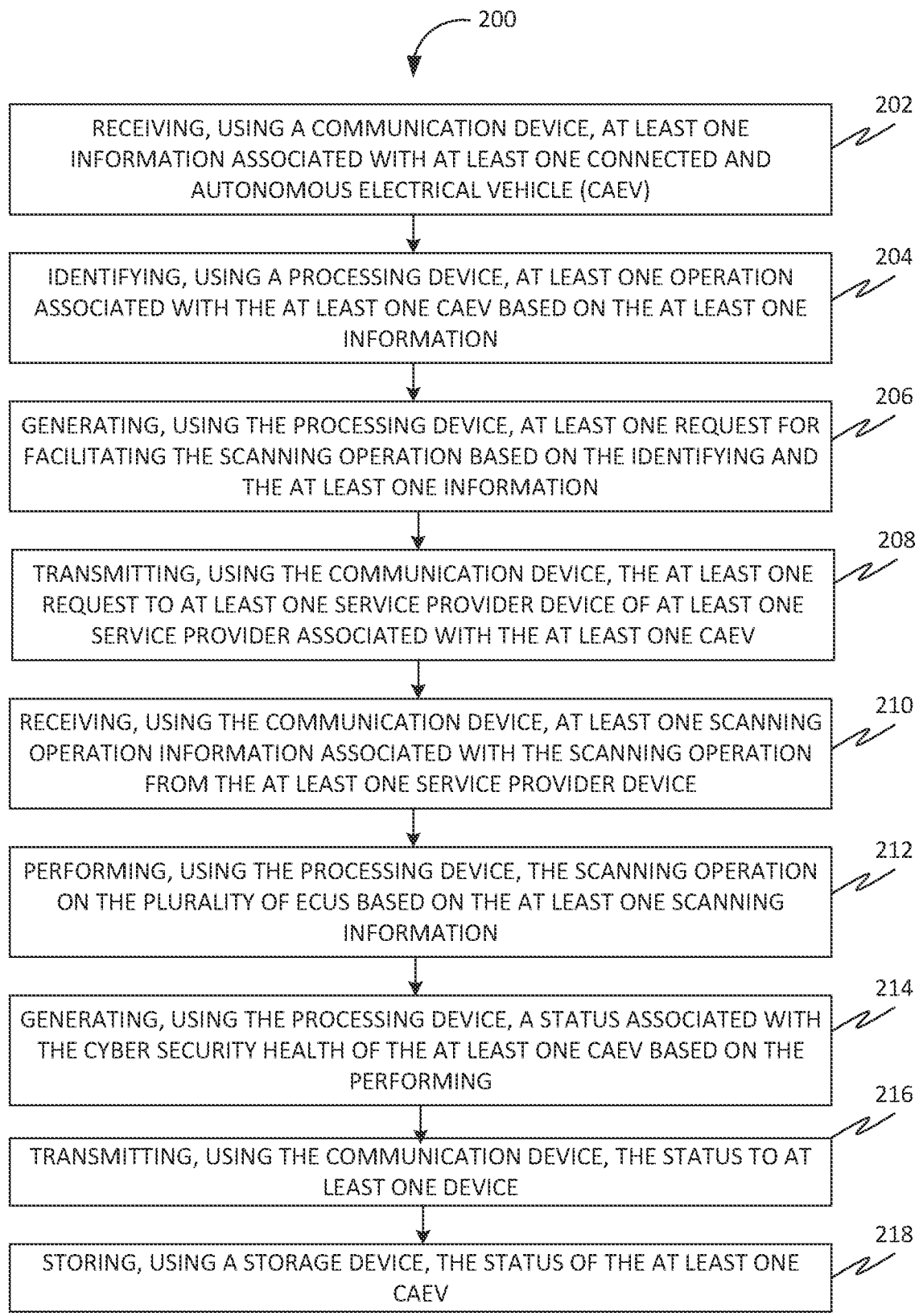
FIG. 2 is a flowchart of a method 200 for facilitating cyber inspection of connected and autonomous electrical vehicles using smart charging stations, in accordance with some embodiments.

FIG. 2 is a flowchart of a method 200 for facilitating cyber inspection of connected and autonomous electrical vehicles using smart charging stations, in accordance with some embodiments.

Further, at 202, the method 200 may include receiving, using a communication device (such as a communication device 602), at least one information associated with at least one connected and autonomous electrical vehicle (CAEV). Further, the at least one CAEV may be connected to a smart charging station (SCS). Further, the at least one information may include at least one identifier associated with the at least one CAEV. Further, the at least one information may include at least one identifier associated with electronic control units (ECUs) of the at least one CAEV. Further, the at least one information may include a scan update status for each of the ECUs. Further, in some embodiments, the receiving of the at least one information may include receiving the at least one information from at least one input device (computing device, client device, etc.) associated with the CAEV. Further, in some embodiments, the receiving of the at least one information may include obtaining the at least one information from a device (computing device, client device, etc.) associated with at least one of the at least one CAEV and the SCS. Further, the device may be comprised in at least one of the at least one CAEV and the SCS. Further, the device may be configured for generating the at least one information.

Further, at 204, the method 200 may include identifying, using a processing device (such as a processing device 604), at least one operation associated with the at least one CAEV based on the at least one information. Further, the at least one operation may include a scanning operation for scanning a plurality of electronic control units (ECUs) of the at least one CAEV.

Further, at 206, the method 200 may include generating, using the processing device, at least one request for facilitating the scanning operation based on the identifying and the at least one information.

Further, at 208, the method 200 may include transmitting, using the communication device, the at least one request to at least one service provider device (such as at least one service provider device 702) of at least one service provider associated with the at least one CAEV. Further, the at least one service provider may include a cybersecurity provider (cybersecurity companies), a cybersecurity scanning service provider, a manufacturer, etc. Further, the at least one service provider device may include a server, a computing device, a client device, etc.

Further, at 210, the method 200 may include receiving, using the communication device, at least one scanning operation information associated with the scanning operation from the at least one service provider device. Further, the scanning operation may be performable using the at least one scanning operation information. Further, the at least one scanning operation information may include scanning instructions for scanning the plurality of ECUs.

Further, at 212, the method 200 may include performing, using the processing device, the scanning operation on the plurality of ECUs for facilitating the cyber inspection of the at least one CAEV based on the at least one scanning information. Further, the performing of the scanning operation may include scanning at least one of a firmware and a software of the plurality of ECUs for threats (cyber threats).

Further, at 214, the method 200 may include generating, using the processing device, a status associated with a cyber security health of the at least one CAEV based on the performing. Further, the status may include a cyber security status of the plurality of ECUs. Further, the status may indicate an infliction of one or more cyber threats to the plurality of ECUs.

Further, at 216, the method 200 may include transmitting, using the communication device, the status to at least one device (such as at least one device 802). Further, the at least one device may include a computing device, a client device, an output device, etc. associated with at least one of a user of the at least one CAEV, the at least one CAEV, and the SCS.

Further, at 218, the method 200 may include storing, using a storage device (such as a storage device 606), the status of the at least one CAEV.

Further, in some embodiments, the receiving of the at least one information may include receiving the at least one information associated with the at least one CAEV from at least one sensor (such as at least one sensor 1102) associated with the SCS. Further, the at least one sensor may be configured for generating the at least one information based on detecting a connection between the at least one CEAV and the SCS. Further, the detecting of the connection may include detecting at least one attribute of the connection. Further, the at least one attribute may indicate a relationship between the at least one CAEV and the SCS. Further, the at least one attribute may include a power level, a current level, a voltage level, a frequency, a temperature, etc. associated with the connection. Further, the connection may include at least one of a wired connection and a wireless connection. Further, the at least one sensor may include a voltage sensor, a current sensor, a power sensor, a frequency sensor, a temperature sensor, etc.

Further, in some embodiments, the receiving of the at least one information may include receiving the at least one information associated with the at least one CAEV from at least one input device (such as at least one input device 902). Further, the at least one input device may be configured for generating a request for the performing of the scanning operation for the at least one CAEV based on at least one input from at least one user associated with the at least one CAEV. Further, the scanning request may include a request for scanning the ECUs. Further, the scanning operation may include at least one of a cyber security threats scan, a cyber-attacks scan, an antivirus scan, an antimalware, an anti-ransomware, and a security scan.

Further, in some embodiments, the method 200 may include analyzing, using the processing device, the at least one information associated with the at least one CAEV using at least one machine learning model. Further, the identifying of the at least one operation may be further based on the analyzing. Further, in an embodiment, the at least one information may include at least one operational information associated with an operation of at least one of the firmware and the software of the ECUs. Further, the operation corresponds to a functioning of at least one of the firmware and the software. Further, the at least one operational information may include at least one performance parameter associated with a performance of the functioning of at least one of the firmware and the software. Further, the at least one performance parameter may include a processor usage, a memory usage, a latency, an uptime, an error rate, a response time, etc. Further, the at least one machine learning model may be trained for detecting a malfunction associated with the ECUs based on operational information of the ECUs. Further, the malfunction corresponds to the at least one operation required for the ECUs.

Further, in an embodiment, the receiving of the at least one information may include receiving the at least one information from at least one sensor. Further, the at least one sensor may be configured for generating the at least one operational information based on detecting the at least one performance parameter. Further, the at least one sensor may include a soft sensor. Further, the soft sensor may be executed by the plurality of ECUs for the generating of the at least one operational information.

Further, in some embodiments, the status may include a scan status of each of the plurality of ECUs.

Figure 3:
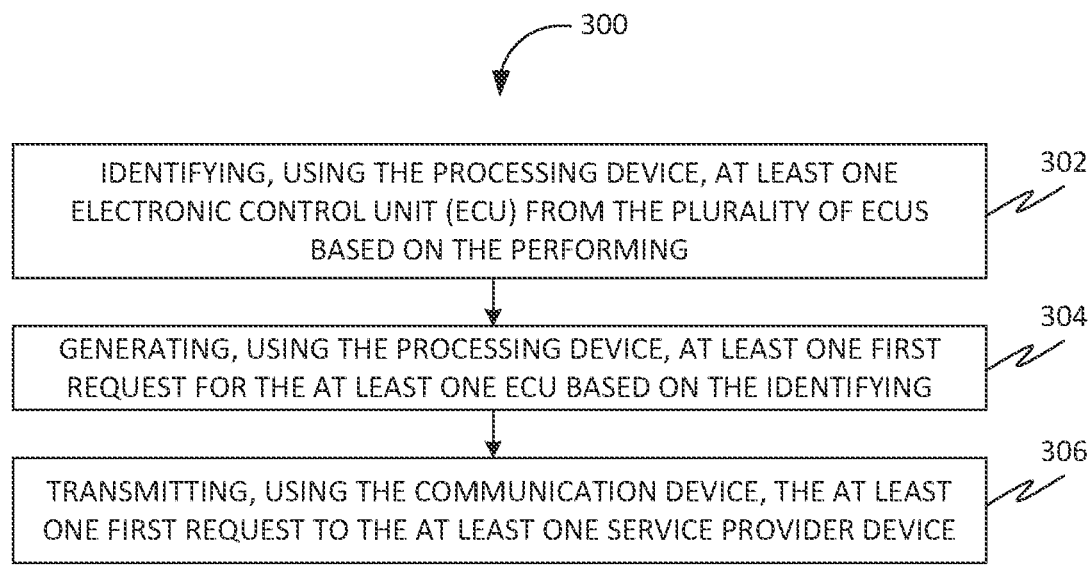
FIG. 3 is a flowchart of a method 300 for facilitating cyber inspection of connected and autonomous electrical vehicles using smart charging stations, in accordance with some embodiments.

FIG. 3 is a flowchart of a method 300 for facilitating cyber inspection of connected and autonomous electrical vehicles using smart charging stations, in accordance with some embodiments.

Further, at 302, the method 300 may include identifying, using the processing device, at least one electronic control unit (ECU) from the plurality of ECUs based on the performing. Further, the at least one ECU may be afflicted or impending to be afflicted by the threats.

Further, at 304, the method 300 may include generating, using the processing device, at least one first request for the at least one ECU based on the identifying. Further, the at least one first request may include at least one identifier associated with the at least one ECU and at least one indication of the threats associated with the at least one ECU.

Further, at 306, the method 300 may include transmitting, using the communication device, the at least one first request to the at least one service provider device.

Figure 4:
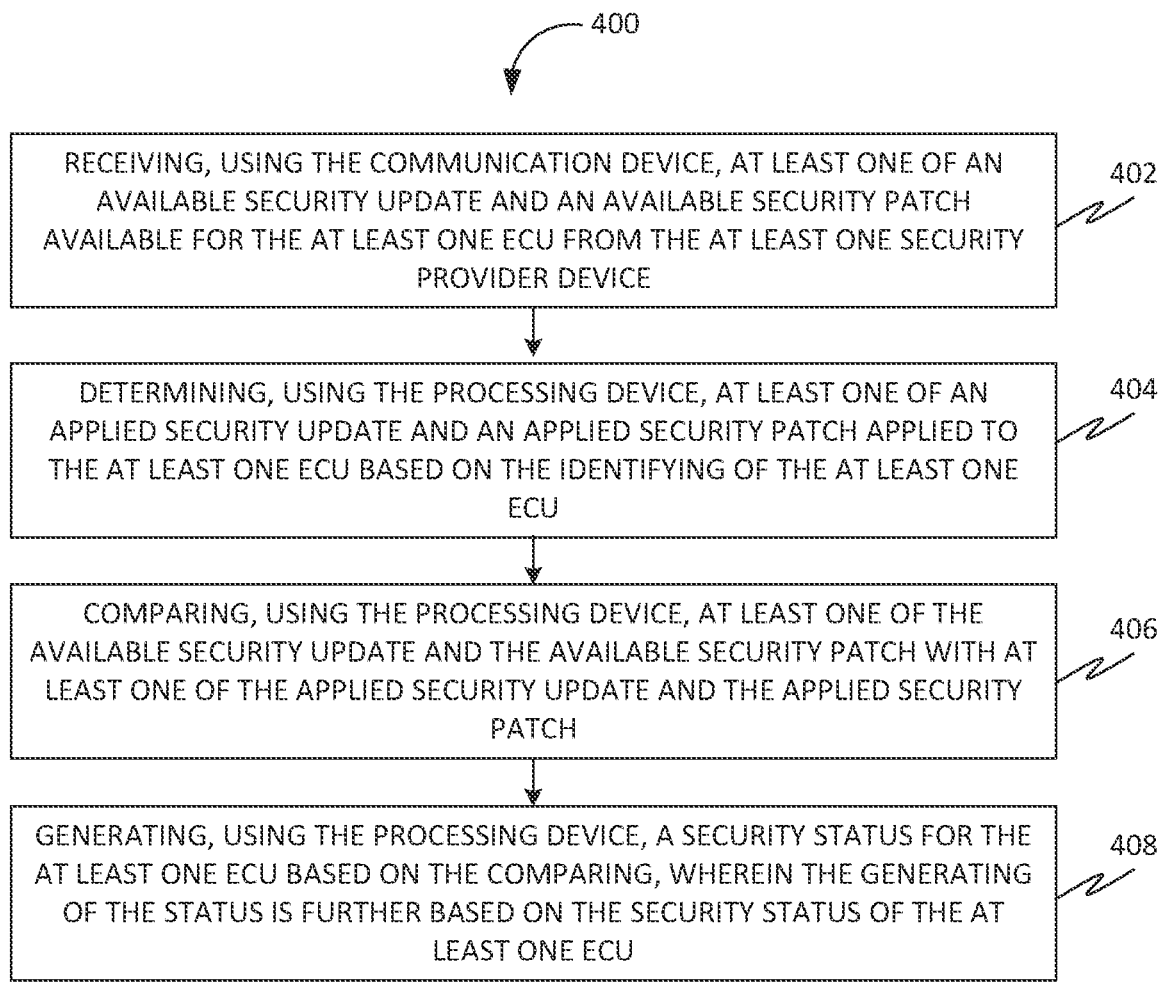
FIG. 4 is a flowchart of a method 400 for facilitating cyber inspection of connected and autonomous electrical vehicles using smart charging stations, in accordance with some embodiments.

FIG. 4 is a flowchart of a method 400 for facilitating cyber inspection of connected and autonomous electrical vehicles using smart charging stations, in accordance with some embodiments.

Further, at 402, the method 400 may include receiving, using the communication device, at least one of an available security update and an available security patch available for the at least one ECU from the at least one service provider device.

Further, at 404, the method 400 may include determining, using the processing device, at least one of an applied security update and an applied security patch applied to the at least one ECU based on the identifying of the at least one ECU.

Further, at 406, the method 400 may include comparing, using the processing device, at least one of the available security update and the available security patch with at least one of the applied security update and the applied security patch. Further, the comparing may include determining a match between at least one of the available security update and the available security patch with at least one of the applied security update and the applied security patch.

Further, at 408, the method 400 may include generating, using the processing device, a security status for the at least one ECU based on the comparing. Further, the generating of the status may be further based on the security status of the at least one ECU. Further, the security status may include a threat status and a non threat status. Further, at least one of the available security update and the available security patch matches with at least one of the applied security update and the applied security patch in the non threat status. Further, at least one of the available security update and the available security patch does not match with at least one of the applied security update and the applied security patch in the threat status.

Figure 5:
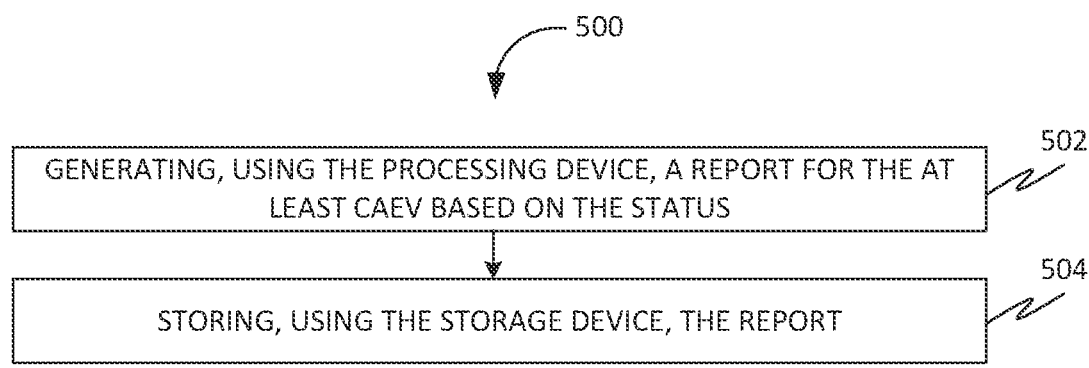
FIG. 5 is a flowchart of a method 500 for facilitating cyber inspection of connected and autonomous electrical vehicles using smart charging stations, in accordance with some embodiments.

FIG. 5 is a flowchart of a method 500 for facilitating cyber inspection of connected and autonomous electrical vehicles using smart charging stations, in accordance with some embodiments.

Further, at 502, the method 500 may include generating, using the processing device, a report for the at least CAEV based on the status. Further, the report may include a cyber security inspection report.

Further, at 504, the method 500 may include storing, using the storage device, the report.

Further, in some embodiments, the method 500 may include transmitting, using the communication device, the report to at least one output device (such as at least one output device 1002). Further, the at least one output device may be configured for presenting the report. Further, the output device may include a printer, a display device, etc.

Further, in some embodiments, the storing of the report may include storing the report in a distributed ledger. Further, the distributed ledger may be associated with a blockchain.

Figure 6:
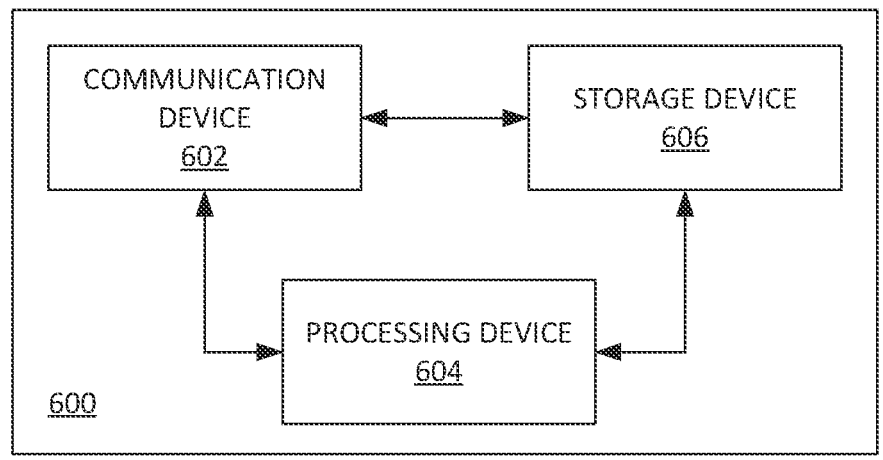
FIG. 6 is a block diagram of a system 600 for facilitating cyber inspection of connected and autonomous electrical vehicles using smart charging stations, in accordance with some embodiments.

FIG. 6 is a block diagram of a system 600 for facilitating cyber inspection of connected and autonomous electrical vehicles using smart charging stations, in accordance with some embodiments. Further, the system 600 may be an inspection system. Further, the system 600 may include a communication device 602, a processing device 604, and a storage device 606.

Figure 7:
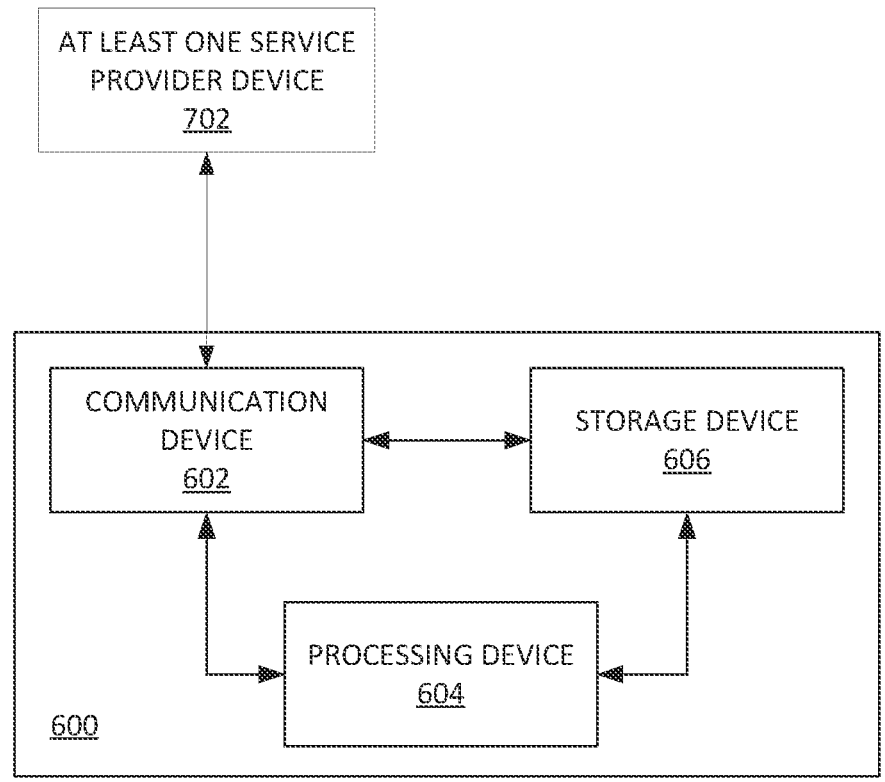
FIG. 7 is a block diagram of the system 600, in accordance with some embodiments.
Figure 8:
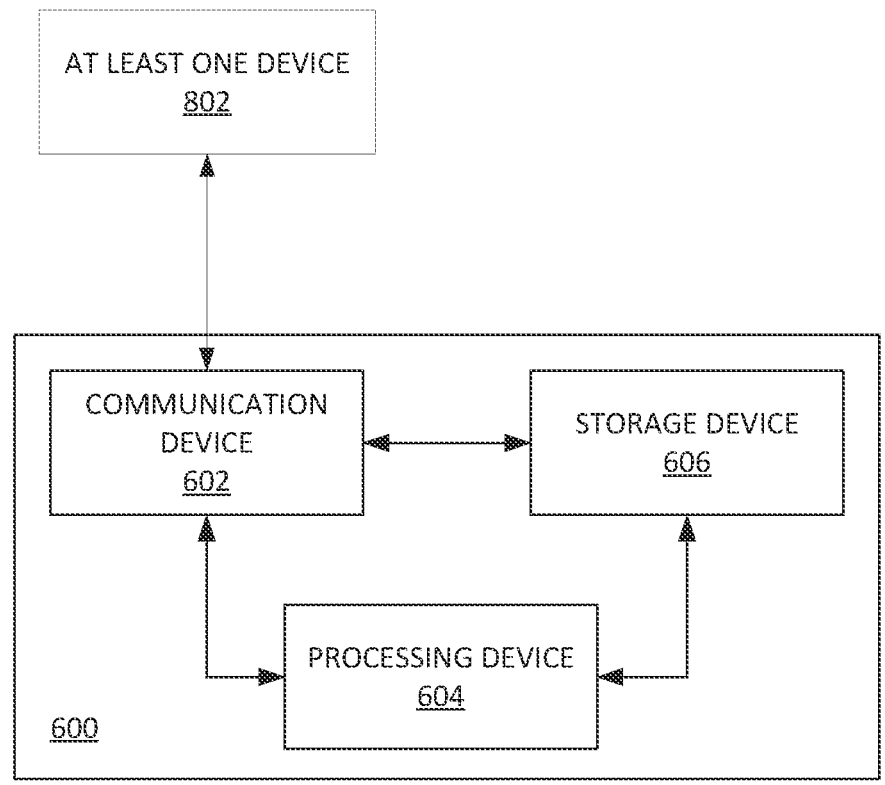
FIG. 8 is a block diagram of the system 600, in accordance with some embodiments.

Further, the communication device 602 may be configured for receiving at least one information associated with at least one connected and autonomous electrical vehicle (CAEV). Further, the at least one CAEV may be connected to a smart charging station (SCS). Further, the communication device 602 may be configured for transmitting at least one request to at least one service provider device 702, as shown in FIG. 7, of at least one service provider associated with the at least one CAEV. Further, the communication device 602 may be configured for receiving at least one scanning operation information associated with a scanning operation from the at least one service provider device 702. Further, the communication device 602 may be configured for transmitting a status to at least one device 802, as shown in FIG. 8.

Further, the processing device 604 may be communicatively coupled with the communication device 602. Further, the processing device 604 may be configured for identifying at least one operation associated with the at least one CAEV based on the at least one information. Further, the at least one operation may include the scanning operation for scanning a plurality of electronic control units (ECUs) of the at least one CAEV. Further, the processing device 604 may be configured for generating the at least one request for facilitating the scanning operation based on the identifying and the at least one information. Further, the processing device 604 may be configured for performing the scanning operation on the plurality of ECUs for facilitating the cyber inspection of the at least one CAEV based on the at least one scanning information. Further, the processing device 604 may be configured for generating the status associated with a cyber security health of the at least one CAEV based on the performing.

Further, the storage device 606 may be communicatively coupled with the processing device 604. Further, the storage device 606 may be configured for storing the status of the at least one CAEV.

Figure 11:
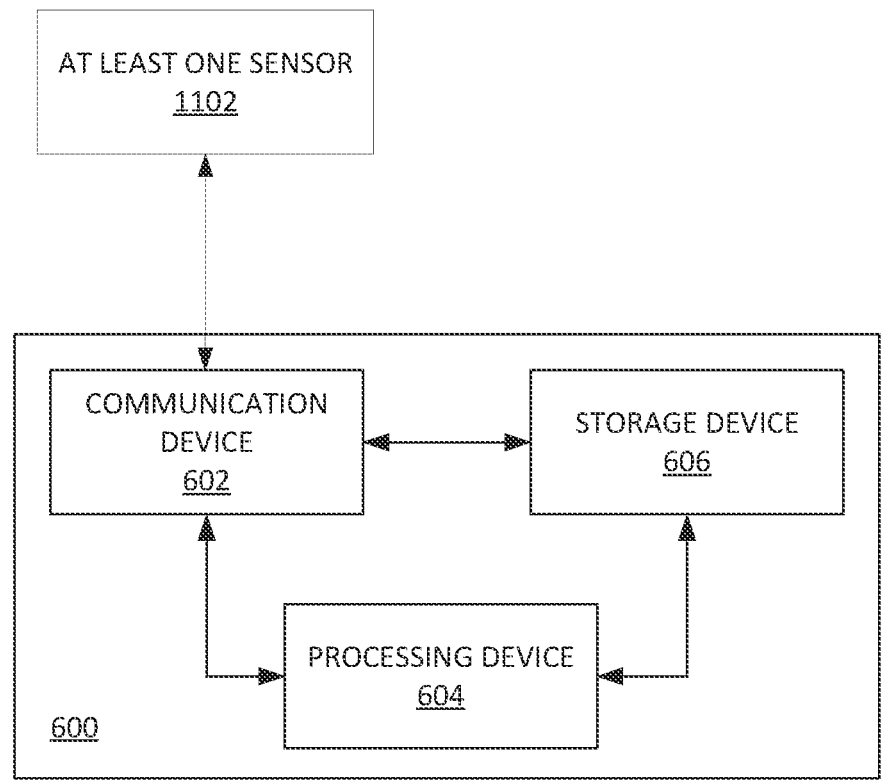
FIG. 11 is a block diagram of the system 600, in accordance with some embodiments.

Further, in some embodiments, the receiving of the at least one information may include receiving the at least one information associated with the at least one CAEV from at least one sensor 1102, as shown in FIG. 11, associated with the SCS. Further, the at least one sensor 1102 may be configured for generating the at least one information based on detecting a connection between the at least one CEAV and the SCS.

Figure 9:
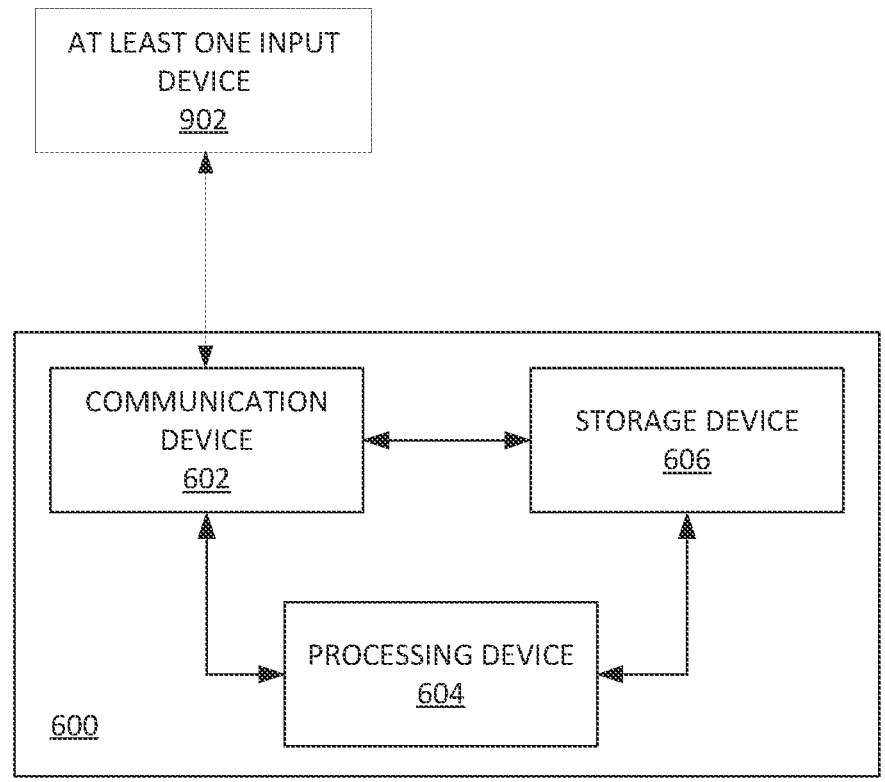
FIG. 9 is a block diagram of the system 600, in accordance with some embodiments.

Further, in some embodiments, the receiving of the at least one information may include receiving the at least one information associated with the at least one CAEV from at least one input device 902, as shown in FIG. 9. Further, the at least one input device 902 may be configured for generating a request for the performing of the scanning operation for the at least one CAEV based on at least one input from at least one user associated with the at least one CAEV. Further, the scanning operation may include at least one of a cyber security threats scan, a cyber-attacks scan, an antivirus scan, an antimalware, an anti-ransomware, and a security scan.

Further, in some embodiments, the processing device 604 may be configured for identifying at least one electronic control unit (ECU) from the plurality of ECUs based on the performing. Further, the processing device 604 may be configured for generating at least one first request for the at least one ECU based on the identifying. Further, the communication device 602 may be configured for transmitting the at least one first request to the at least one service provider device 702.

Further, in some embodiments, the communication device 602 may be configured for receiving at least one of an available security update and an available security patch available for the at least one ECU from the at least one service provider device 702. Further, the processing device 604 may be further configured for determining at least one of an applied security update and an applied security patch applied to the at least one ECU based on the identifying of the at least one ECU. Further, the processing device 604 may be configured for comparing at least one of the available security update and the available security patch with at least one of the applied security update and the applied security patch. Further, the processing device 604 may be configured for generating a security status for the at least one ECU based on the comparing. Further, the generating of the status may be based on the security status of the at least one ECU.

Further, in some embodiments, the processing device 604 may be further configured for generating a report for the at least one CAEV based on the status. Further, the storage device 606 may be configured for storing the report.

Figure 10:
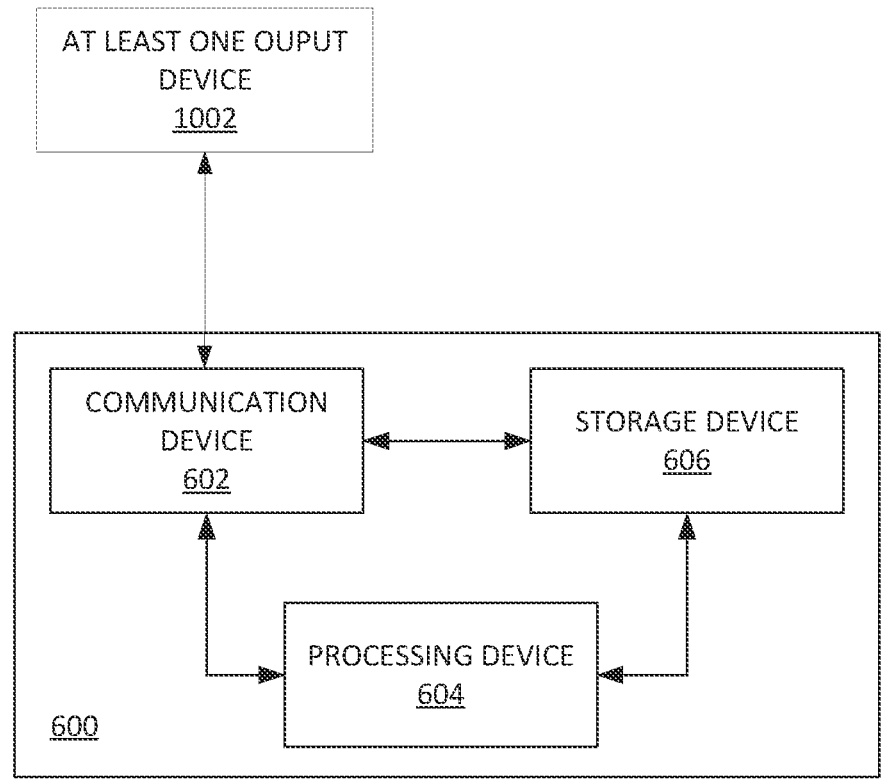
FIG. 10 is a block diagram of the system 600, in accordance with some embodiments.

Further, in some embodiments, the communication device 602 may be configured for transmitting the report to at least one output device 1002, as shown in FIG. 10. Further, the at least one output device 1002 may be configured for presenting the report.

Further, in some embodiments, the storing of the report may include storing the report in a distributed ledger.

Further, in some embodiments, the processing device 604 may be configured for analyzing the at least one information associated with the at least one CAEV using at least one machine learning model. Further, the identifying of the at least one operation may be further based on the analyzing.

Further, in some embodiments, the status may include a scan status of each of the plurality of ECUs.

FIG. 7 is a block diagram of the system 600, in accordance with some embodiments.

FIG. 8 is a block diagram of the system 600, in accordance with some embodiments.

FIG. 9 is a block diagram of the system 600, in accordance with some embodiments.

FIG. 10 is a block diagram of the system 600, in accordance with some embodiments.

FIG. 11 is a block diagram of the system 600, in accordance with some embodiments.

Figure 12:
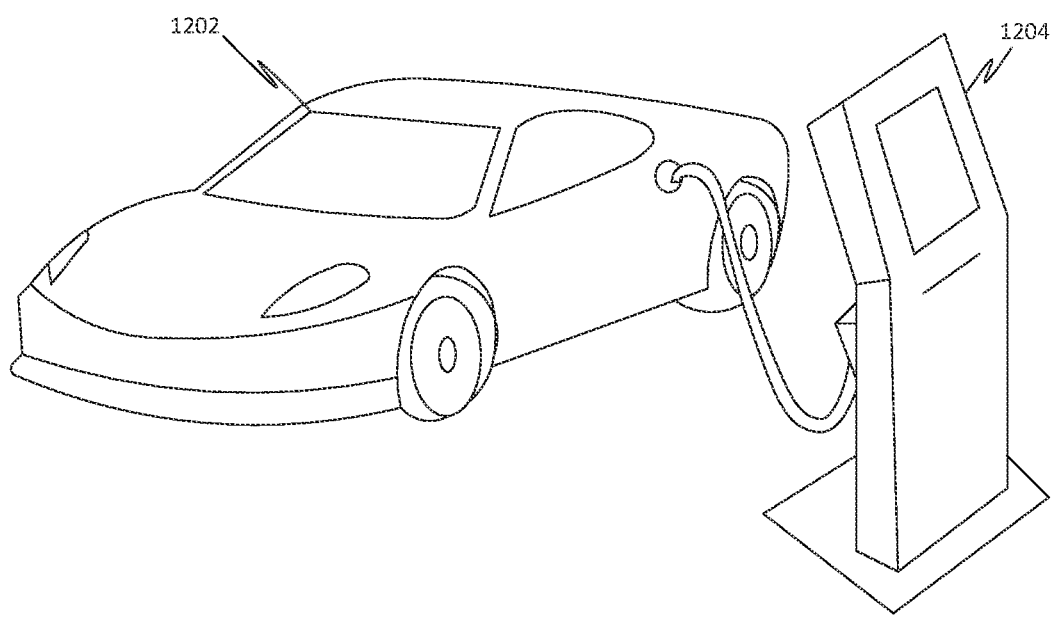
FIG. 12 illustrates a connected and autonomous electrical vehicle (CAEV) 1202 connected to a smart charging station (SCS) 1204, in accordance with some embodiments.

FIG. 12 illustrates a connected and autonomous electrical vehicle (CAEV) 1202 connected to a smart charging station (SCS) 1204, in accordance with some embodiments.

Figure 13:
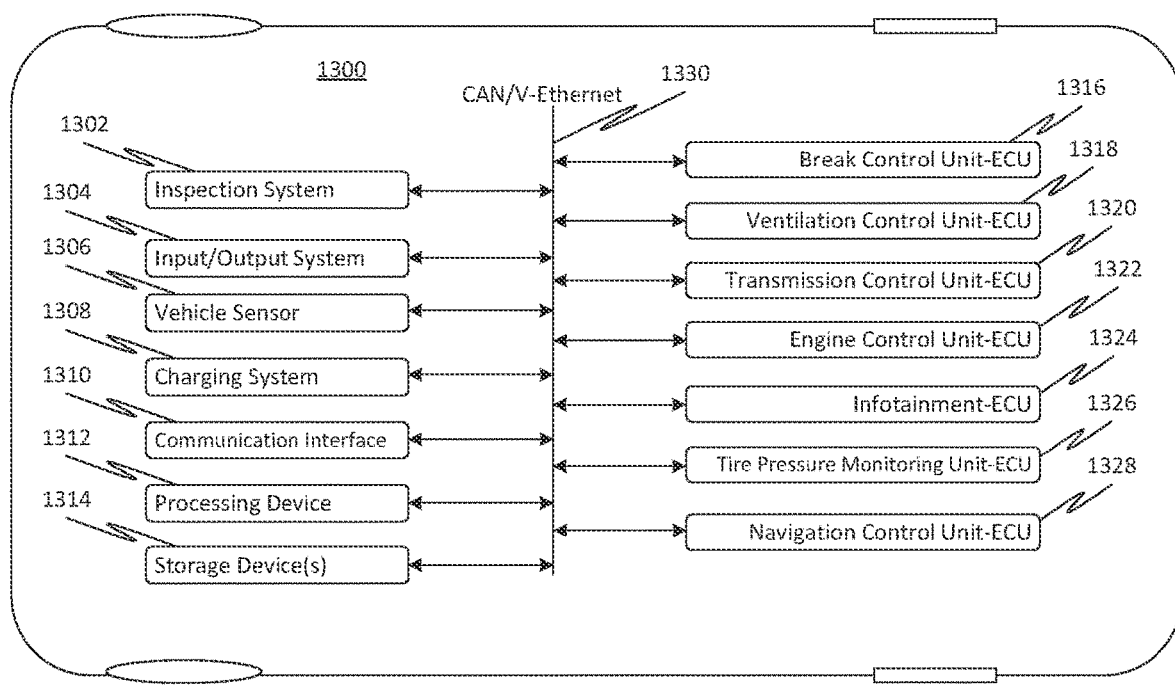
FIG. 13 is a block diagram of a connected and autonomous electrical vehicle (CAEV) 1300, in accordance with some embodiments.

FIG. 13 is a block diagram of a connected and autonomous electrical vehicle (CAEV) 1300, in accordance with some embodiments. Accordingly, the CAEV 1300 may include an inspection system 1302. Further, the CAEV 1300 may include an input/output system 1304. Further, the CAEV 1300 may include at least one vehicle sensor 1306 (such as a sensor 1102). Further, the CAEV 1300 may include a charging system 1308. Further, the CAEV 1300 may include a communication interface 1310. Further, the CAEV 1300 may include a processing device 1312 (such as a processing device 604). Further, the CAEV 1300 may include a storage device 1314 (such as a storage device 606). Further, the CAEV 1300 may include a plurality of electronic control units (ECUs). Further, the plurality of ECUs may include a break control unit 1316. Further, the plurality of ECUs may include a ventilation control unit 1318. Further, the plurality of ECUs may include a transmission control unit 1320. Further, the plurality of ECUs may include an engine control unit 1322. Further, the plurality of ECUs may include a tire pressure monitoring unit 1326. Further, the plurality of ECUs may include a navigation control unit 1328. Further, the plurality of ECUs may include an infotainment ECU 1324. Further, the CAEV 1300 may include a CAN/V Ethernet 1330 for connecting a plurality of components (1302-1328) of the CAEV 1300 together.

Figure 14:
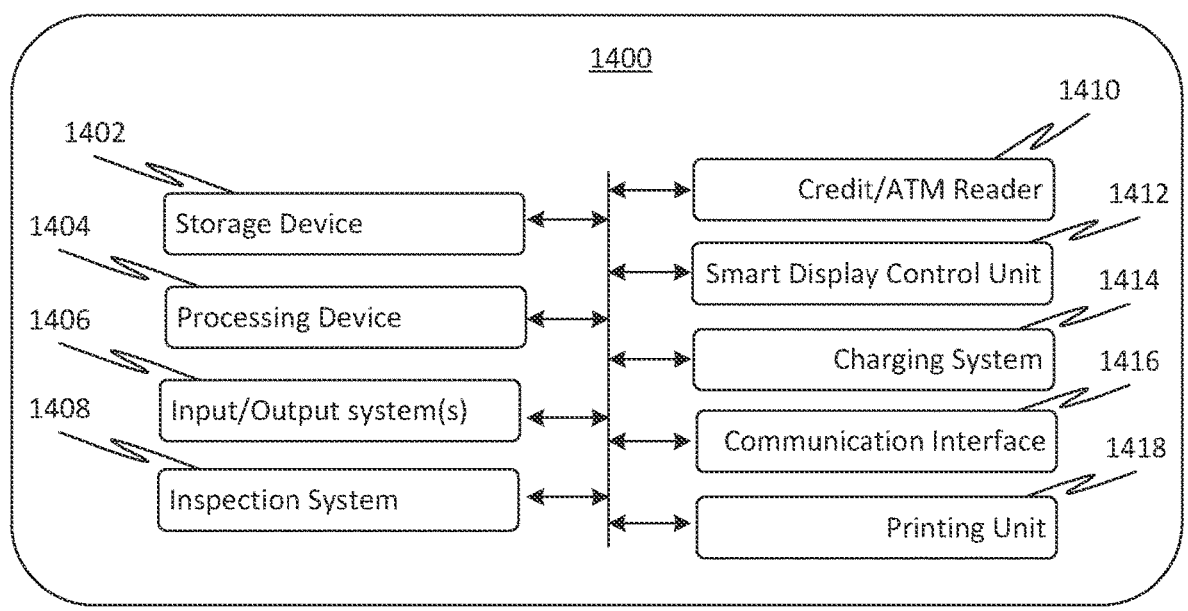
FIG. 14 is a block diagram of a smart charging station (SCS) 1400, in accordance with some embodiments.

FIG. 14 is a block diagram of a smart charging station (SCS) 1400, in accordance with some embodiments. Accordingly, the SCS 1400 may include a storage device 1402 (such as a storage device 606). Further, the SCS 1400 may include a processing device 1404 (such as a processing device 604). Further, the SCS 1400 may include an input/output system 1406. Further, the SCS 1400 may include an inspection system 1408. Further, the SCS 1400 may include at least one transaction module (such as a credit/ATM reader 1410) that may include at least one of a credit card/automated teller machine (ATM) reader 1410. Further, the SCS 1400 may include a smart display controlling unit 1412. Further, the SCS 1400 may include a charging system 1414. Further, the SCS 1400 may include a communication interface 1416. Further, the SCS 1400 may include a printing unit 1418 (printer). Further, each of the storage device 1402, the processing device 1404, the input/output system 1406, the inspection system 1408, the credit/ATM reader 1410, the smart display controlling unit 1412, the charging system 1414, the communication interface 1416, and the printing unit 1418 may be interconnected using a connection means (Ethernet cable).

Figure 15:
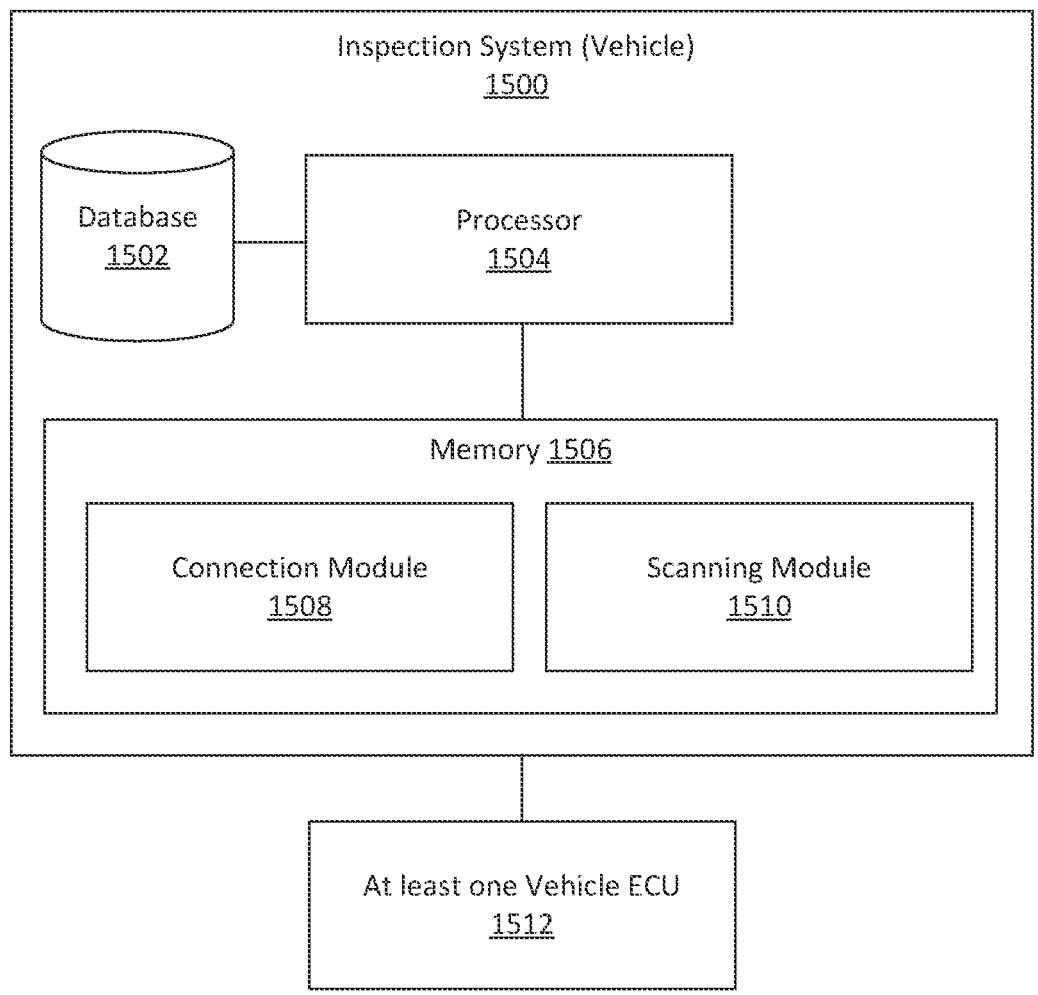
FIG. 15 is a block diagram of an inspection system 1500 of a connected and autonomous electrical vehicle (CAEV), in accordance with some embodiments.

FIG. 15 is a block diagram of an inspection system 1500 of a connected and autonomous electrical vehicle (CAEV), in accordance with some embodiments. Accordingly, the inspection system 1500 may include a database 1502. Further, the inspection system 1500 may include a processor 1504. Further, the database 1502 may be communicatively coupled with the processor 1504. Further, the inspection system 1500 may include a memory 1506 communicatively coupled with the processing 1504. Further, the memory 1506 may include a connection module 1508 and a scanning module 1510. Further, the inspection system 1500 may be communicatively coupled with at least one vehicle electronic control unit (ECU) 1512 (such as at least one ECU 1512).

Figure 16:
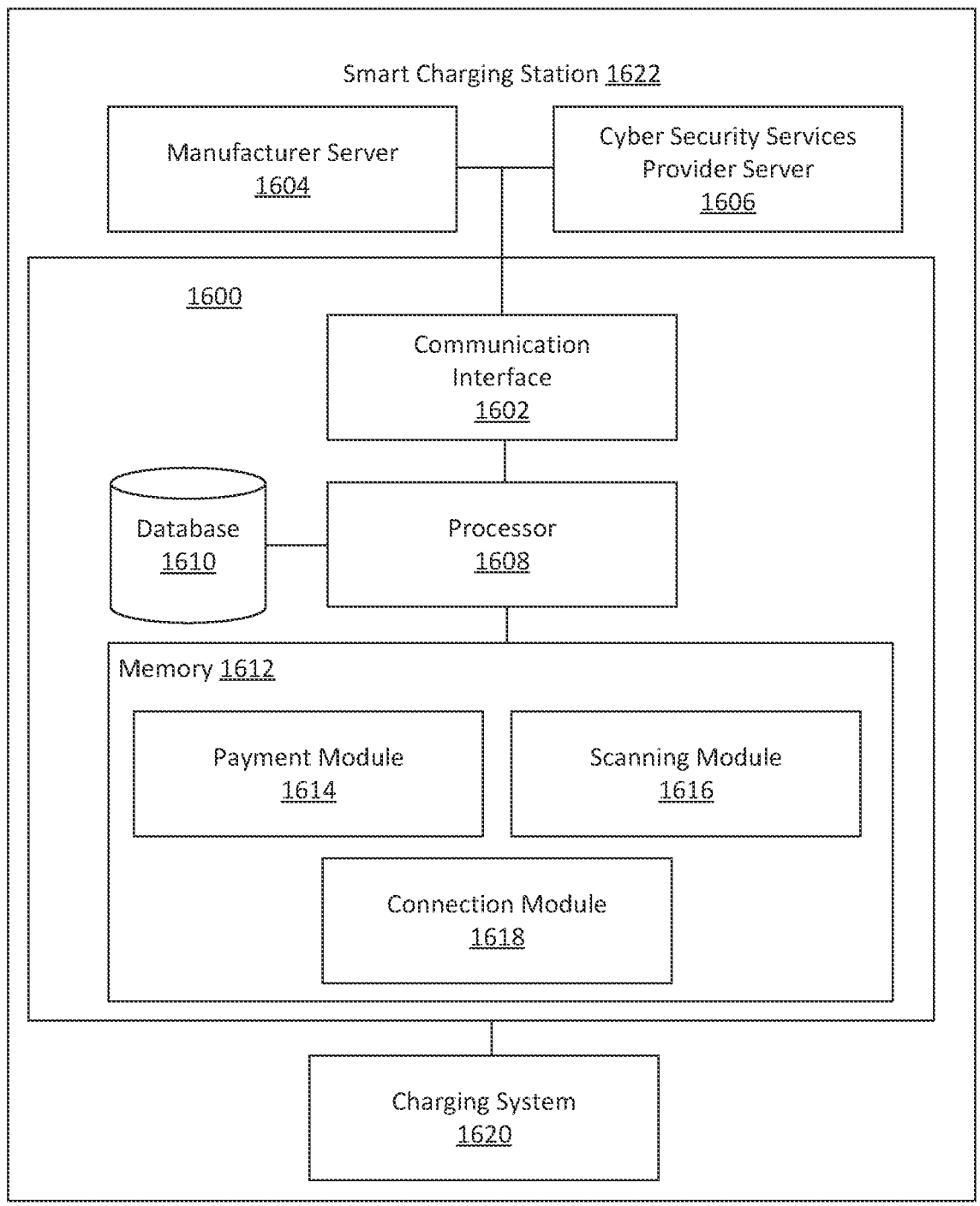
FIG. 16 is a block diagram of an inspection system 1600 for facilitating scanning of a connected autonomous electrical vehicle (CAEV) using a smart charging station (SCS) 1622, in accordance with some embodiments.

FIG. 16 is a block diagram of an inspection system 1600 for facilitating scanning of a connected autonomous electrical vehicle (CAEV) using a smart charging station (SCS) 1622, in accordance with some embodiments. Accordingly, the inspection system 1600 may include a communication interface 1602, a processor 1608, a database 1610, and a memory 1612. Further, the communication interface 1602 may be communicatively coupled with a manufacturer server 1604 and a cybersecurity services provider server 1606 associated with the smart charging station (SCS) 1622. Further, the processor 1608 may be communicatively coupled with the communication interface 1602. Further, the database 1610 may be communicatively coupled with the processor 1608. Further, the memory 1612 may be communicatively coupled with the processor 1608. Further, the memory 1612 may include a payment module 1614, a scanning module 1616, and a connection module 1618. Further, the inspection system 1600 may be communicatively coupled with a charging system 1620 associated with the smart charging station (SCS) 1622.

Figure 17:
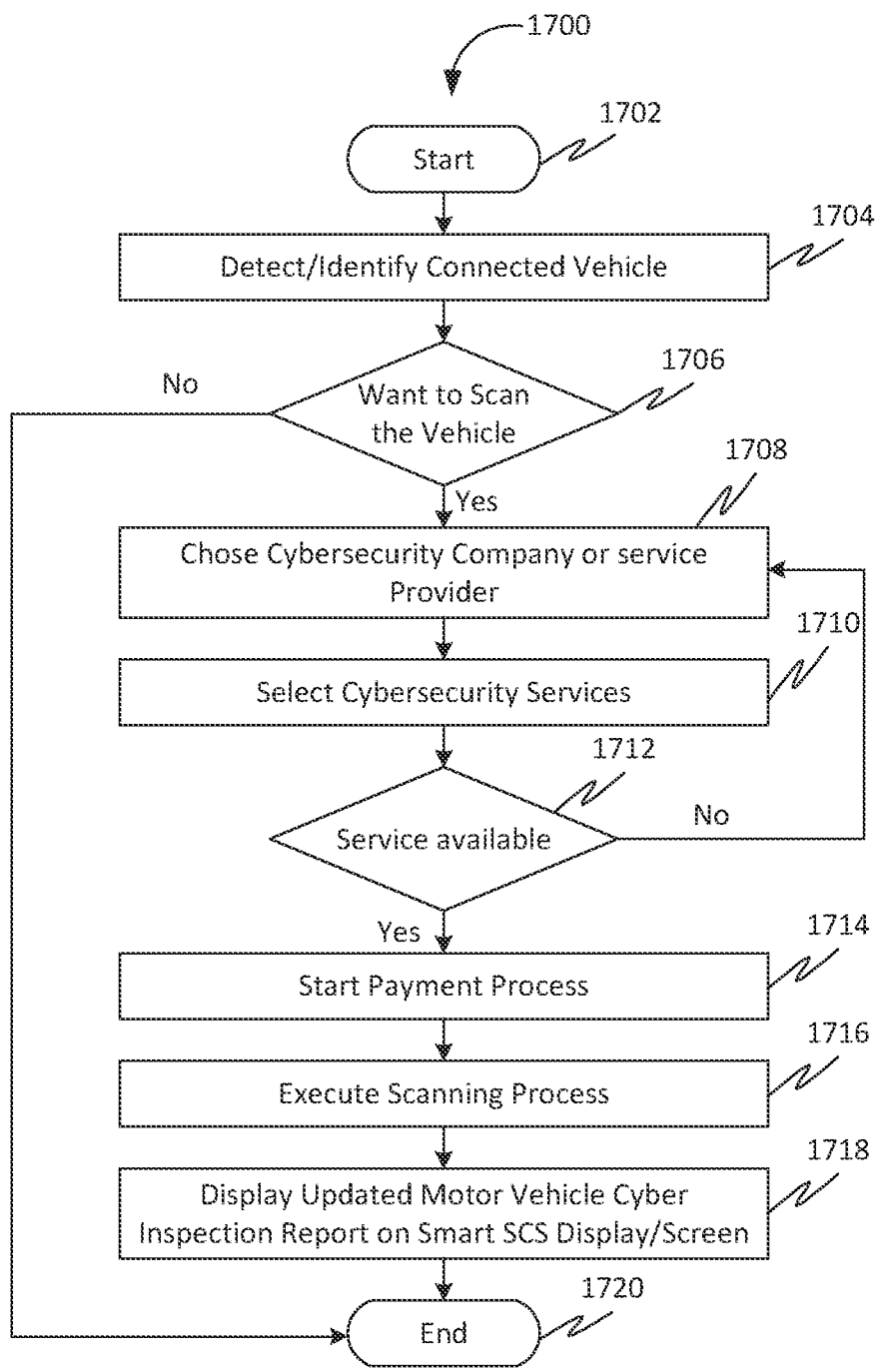
FIG. 17 is a flowchart of a method 1700 for facilitating transactions associated with cybersecurity services for connected autonomous electrical vehicles (CAEVs), in accordance with some embodiments.

FIG. 17 is a flowchart of a method 1700 for facilitating transactions associated with cybersecurity services for connected autonomous electrical vehicles (CAEVs), in accordance with some embodiments.

Further, at 1702, the method 1700 may start.

Further, at 1704, the method 1700 may include detecting/identifying a connected autonomous electrical vehicle (CAEV).

Further, at 1706, the method 1700 may include deciding if a user wants to scan the CAEV. Further, if the user decides to scan (yes) the CAEV, the method 1700 may proceed to 1708. Further, if the user does not want to scan (no) the CAEV, the method 1700 may proceed to 1720.

Further, at 1708, the method 1700 may include choosing a cybersecurity service provider (or cybersecurity company).

Further, at 1710, the method 1700 may include selecting cybersecurity services.

Further, at 1712, the method 1700 may include checking service availability. Further, if the service is available (yes), the method 1700 may proceed to step 1714. Further, if the service is not available (no), the method 1700 may proceed to step 1708.

Further, at 1714, the method 1700 may include starting a payment process.

Further, at 1716, the method 1700 may include executing a scanning process.

Further, at 1718, the method 1700 may include displaying an updated motor vehicle cyber inspection report on a smart display (or screen) of the SCS.

Further, at 1720, the method 1700 may end.

Figure 18:
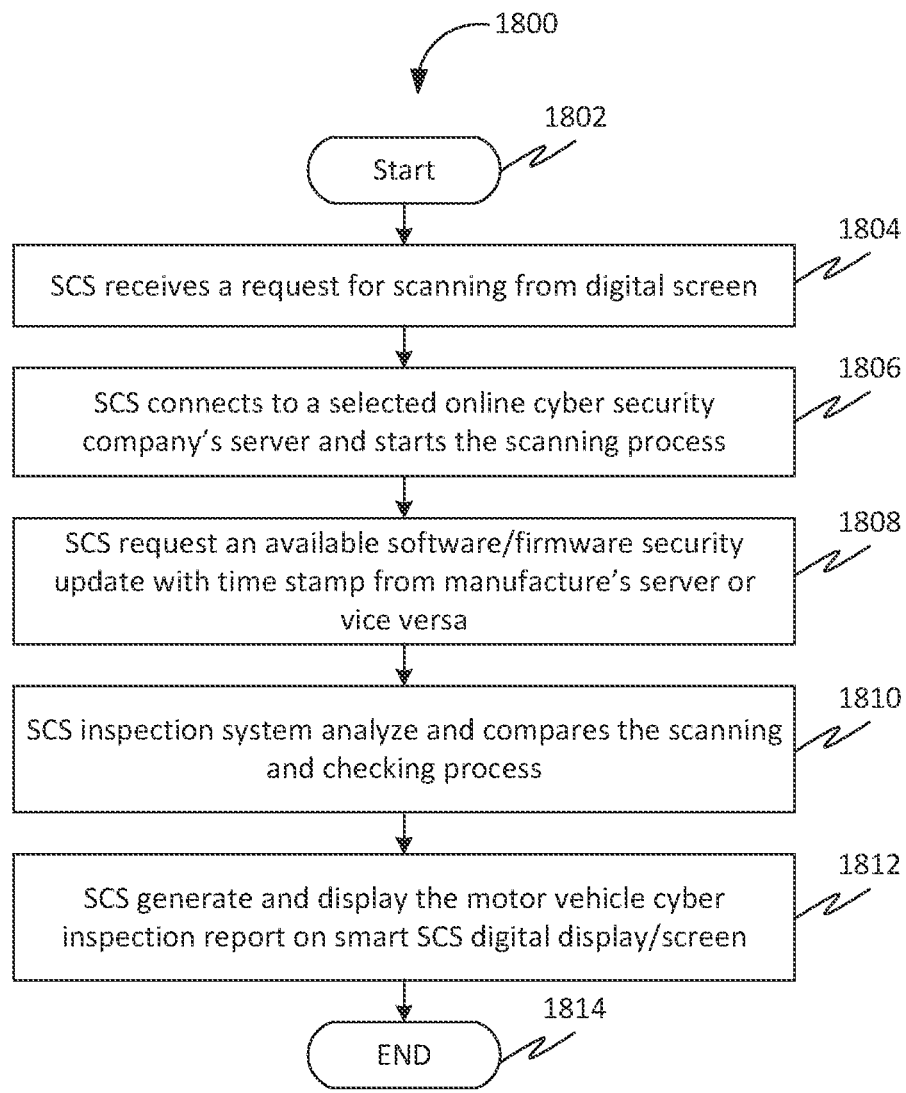
FIG. 18 is a flowchart of a method 1800 for facilitating payments for cyber security services associated with a connected autonomous electrical vehicle (CAEV), in accordance with some embodiments.

FIG. 18 is a flowchart of a method 1800 for facilitating payments for cyber security services associated with a connected autonomous electrical vehicle (CAEV), in accordance with some embodiments.

Further, at 1802, the method 1800 may start.

Further, at 1804, the method 1800 may include receiving a request for scanning by a smart charging station (SCS) from a digital screen.

Further, at 1806, the method 1800 may include connecting the SCS to a selected online cyber security company's server and starting a scanning process.

Further, at 1808, the method 1800 may include requesting an available software/firmware security update with a time stamp by SCS to a manufacturer's server or vice versa.

Further, at 1810, the method 1800 may include analyzing and comparing a scanning and checking process by an inspection system of the SCS.

Further, at 1812, the method 1800 may include generating and displaying a motor vehicle cyber inspection report by the SCS on a smart SCS digital display/screen.

Further, at 1814, the method 1800 may end.

Figure 19:
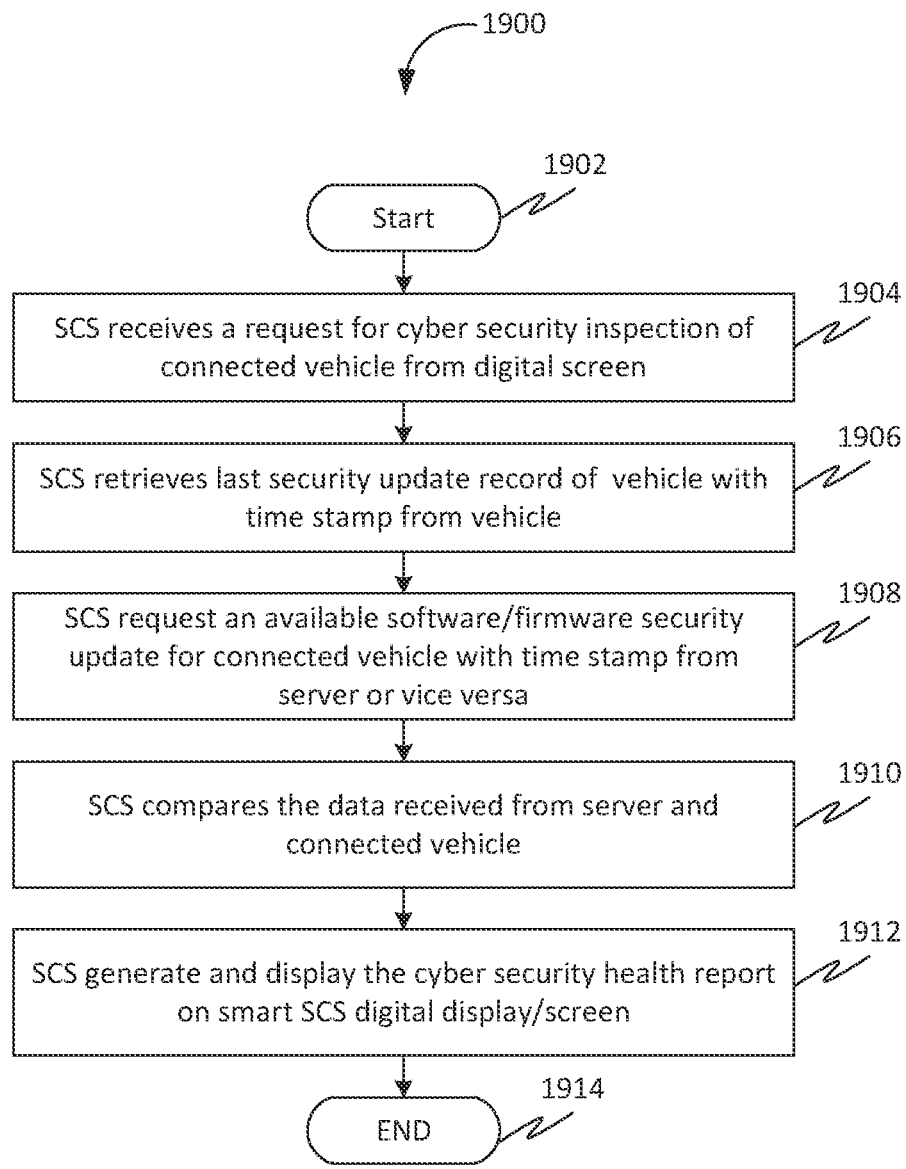
FIG. 19 is a flowchart of a method 1900 for facilitating displaying cybersecurity health status associated with a connected autonomous electrical vehicle (CAEV) using a smart charging station (SCS), in accordance with some embodiments.

FIG. 19 is a flowchart of a method 1900 for facilitating displaying cybersecurity health status associated with a connected autonomous electrical vehicle (CAEV) using a smart charging station (SCS), in accordance with some embodiments.

Further, at 1902, the method 1900 may start.

Further, at 1904, the method 1900 may include receiving, using a smart charging station (SCS), a request for scanning the CAEV from a digital screen.

Further, at 1906, the method 1900 may include retrieving, using the SCS, a last security update record of the CAEV with a time stamp from the CAEV.

Further, at 1908, the method 1900 may include requesting, using SCS, an available software/firmware security update with a time stamp for the CAEV to a manufacturer's server or vice versa.

Further, at 1910, the method 1900 may include comparing, using the SCS, a data received from a server and the CAEV.

Further, at 1912, the method 1900 may include generating and displaying, using the SCS, a cybersecurity health report on a smart SCS digital display/screen.

Further, at 1914, the method 1900 may end.

Figure 20:
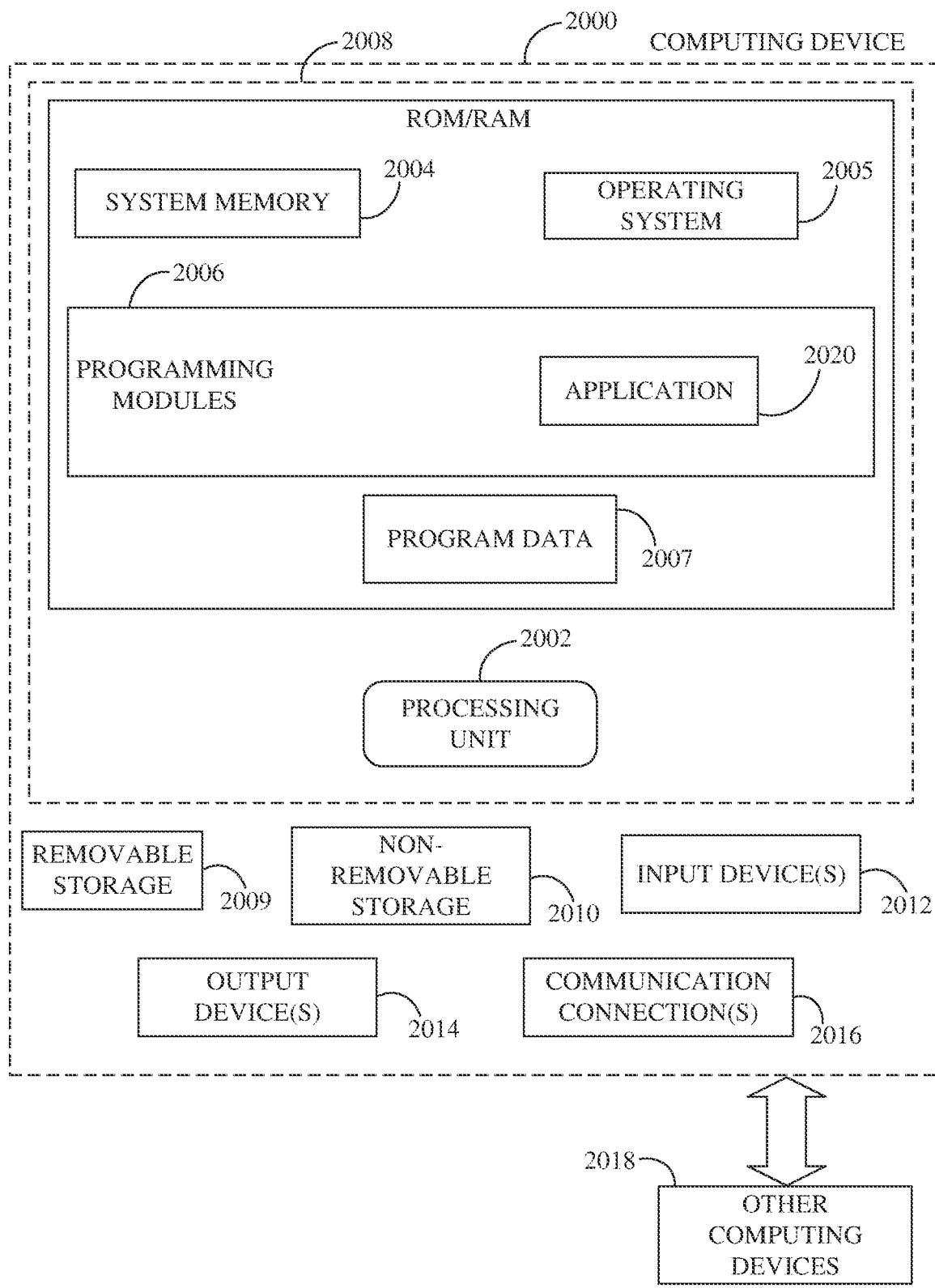
FIG. 20 is a block diagram of a computing device for implementing the methods disclosed herein, in accordance with some embodiments.

With reference to FIG. 20, a system consistent with an embodiment of the disclosure may include a computing device or cloud service, such as computing device 2000. In a basic configuration, computing device 2000 may include at least one processing unit 2002 and a system memory 2004. Depending on the configuration and type of computing device, system memory 2004 may comprise, but is not limited to, volatile (e.g., random-access memory (RAM)), non-volatile (e.g., read-only memory (ROM)), flash memory, or any combination. System memory 2004 may include operating system 2005, one or more programming modules 2006, and may include a program data 2007. Operating system 2005, for example, may be suitable for controlling computing device 2000's operation. In one embodiment, programming modules 2006 may include image-processing module, machine learning module. Furthermore, embodiments of the disclosure may be practiced in conjunction with a graphics library, other operating systems, or any other application program and is not limited to any particular application or system. This basic configuration is illustrated in FIG. 20 by those components within a dashed line 2008.

Computing device 2000 may have additional features or functionality. For example, computing device 2000 may also include additional data storage devices (removable and/or non-removable) such as, for example, magnetic disks, optical disks, or tape. Such additional storage is illustrated in FIG. 20 by a removable storage 2009 and a non-removable storage 2010. Computer storage media may include volatile and non-volatile, removable and non-removable media implemented in any method or technology for storage of information, such as computer-readable instructions, data structures, program modules, or other data. System memory 2004, removable storage 2009, and non-removable storage 2010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2000. Any such computer storage media may be part of device 2000. Computing device 2000 may also have input device(s) 2012 such as a keyboard, a mouse, a pen, a sound input device, a touch input device, a location sensor, a camera, a biometric sensor, etc. Output device(s) 2014 such as a display, speakers, a printer, etc. may also be included. The aforementioned devices are examples and others may be used.

Computing device 2000 may also contain a communication connection 2016 that may allow device 2000 to communicate with other computing devices 2018, such as over a network in a distributed computing environment, for example, an intranet or the Internet. Communication connection 2016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2004, including operating system 2005. While executing on processing unit 2002, programming modules 2006 (e.g., application 2020 such as a media player) may perform processes including, for example, one or more stages of methods, algorithms, systems, applications, servers, databases as described above. The aforementioned process is an example, and processing unit 2002 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method for facilitating cyber inspection of connected and autonomous electrical vehicles using smart charging stations, the method comprising:
   receiving, using a communication device, at least one information associated with at least one connected and autonomous electrical vehicle (CAEV), wherein the at least one CAEV is connected to a smart charging station (SCS);
   identifying, using a processing device, at least one operation associated with the at least one CAEV based on the at least one information, wherein the at least one operation comprises a scanning operation for scanning a plurality of electronic control units (ECUs) of the at least one CAEV;
   generating, using the processing device, at least one request for facilitating the scanning operation based on the identifying and the at least one information;
   transmitting, using the communication device, the at least one request to at least one service provider device of at least one service provider associated with the at least one CAEV, wherein the at least one service provider comprises at least one cyber security provider;
   receiving, using the communication device, at least one scanning operation information associated with the scanning operation from the at least one service provider device;
   performing, using the processing device, the scanning operation on the plurality of ECUs for facilitating the cyber inspection of the at least one CAEV based on the at least one scanning information;
   generating, using the processing device, a status associated with a cyber security health of the at least one CAEV based on the performing;
   transmitting, using the communication device, the status to at least one device;
   storing, using a storage device, the status of the at least one CAEV;
   identifying, using the processing device, at least one electronic control unit (ECU) from the plurality of ECUs based on the performing;
   generating, using the processing device, at least one first request for the at least one ECU based on the identifying; and
   transmitting, using the communication device, the at least one first request to the at least one service provider device.

2. The method of claim 1, wherein the receiving of the at least one information comprises receiving the at least one information associated with the at least one CAEV from at least one sensor associated with the SCS, wherein the at least one sensor is configured for generating the at least one information based on detecting a connection between the at least one CEAV and the SCS.

3. The method of claim 1, wherein the receiving of the at least one information comprises receiving the at least one information associated with the at least one CAEV from at least one input device, wherein the at least one input device is configured for generating a request for the performing of the scanning operation for the at least one CAEV based on at least one input from at least one user associated with the at least one CAEV, wherein the scanning operation comprises at least one of a cyber security threats scan, a cyber-attacks scan, an antivirus scan, an antimalware, an anti-ransomware, and a security scan.

4. The method of claim 1 further comprising:
receiving, using the communication device, at least one of an available security update and an available security patch available for the at least one ECU from the at least one service provider device;
determining, using the processing device, at least one of an applied security update and an applied security patch applied to the at least one ECU based on the identifying of the at least one ECU;
comparing, using the processing device, at least one of the available security update and the available security patch with at least one of the applied security update and the applied security patch; and
generating, using the processing device, a security status for the at least one ECU based on the comparing, wherein the generating of the status is further based on the security status of the at least one ECU.

5. The method of claim 1 further comprises:
generating, using the processing device, a report for the at least one CAEV based on the status; and
storing, using the storage device, the report.

6. The method of claim 5 further comprising transmitting, using the communication device, the report to at least one output device, wherein the at least one output device is configured for presenting the report.

7. The method of claim 6, wherein the storing of the report comprises storing the report in a distributed ledger.

8. The method of claim 1 further comprising analyzing, using the processing device, the at least one information associated with the at least one CAEV using at least one machine learning model, wherein the identifying of the at least one operation is further based on the analyzing.

9. The method of claim 1, wherein the status comprises a scan status of each of the plurality of ECUs.

10. A system for facilitating cyber inspection of connected and autonomous electrical vehicles using smart charging stations, the system comprising:
a communication device configured for:
receiving at least one information associated with at least one connected and autonomous electrical vehicle (CAEV), wherein the at least one CAEV is connected to a smart charging station (SCS);
transmitting at least one request to at least one service provider device of at least one service provider associated with the at least one CAEV, wherein the at least one service provider comprises at least one cyber security provider;
receiving at least one scanning operation information associated with a scanning operation from the at least one service provider device; and
transmitting a status to at least one device;
a processing device communicatively coupled with the communication device, wherein the processing device is configured for:

identifying at least one operation associated with the at least one CAEV based on the at least one information, wherein the at least one operation comprises the scanning operation for scanning a plurality of electronic control units (ECUs) of the at least one CAEV;
generating the at least one request for facilitating the scanning operation based on the identifying and the at least one information;
performing the scanning operation on the plurality of ECUs for facilitating the cyber inspection of the at least one CAEV based on the at least one scanning information; and
generating the status associated with a cyber security health of the at least one CAEV based on the performing;
a storage device communicatively coupled with the processing device, wherein the storage device is configured for storing the status of the at least one CAEV;
identifying at least one electronic control unit (ECU) from the plurality of ECUs based on the performing; and
generating at least one first request for the at least one ECU based on the identifying, wherein the communication device is further configured for transmitting the at least one first request to the at least one service provider device.

11. The system of claim 10, wherein the receiving of the at least one information comprises receiving the at least one information associated with the at least one CAEV from at least one sensor associated with the SCS, wherein the at least one sensor is configured for generating the at least one information based on detecting a connection between the at least one CEAV and the SCS.

12. The system of claim 10, wherein the receiving of the at least one information comprises receiving the at least one information associated with the at least one CAEV from at least one input device, wherein the at least one input device is configured for generating a request for the performing of the scanning operation for the at least one CAEV based on at least one input from at least one user associated with the at least one CAEV, wherein the scanning operation comprises at least one of a cyber security threats scan, a cyber-attacks scan, an antivirus scan, an antimalware, an anti-ransomware, and a security scan.

13. The system of claim 10, wherein the communication device is further configured for receiving at least one of an available security update and an available security patch available for the at least one ECU from the at least one service provider device, wherein the processing device is further configured for:
determining at least one of an applied security update and an applied security patch applied to the at least one ECU based on the identifying of the at least one ECU;
comparing at least one of the available security update and the available security patch with at least one of the applied security update and the applied security patch; and
generating a security status for the at least one ECU based on the comparing, wherein the generating of the status is further based on the security status of the at least one ECU.

14. The system of claim 10, wherein the processing device is further configured for generating a report for the at least one CAEV based on the status, wherein the storage device is further configured for storing the report.

15. The system of claim 14, wherein the communication device is further configured for transmitting the report to at least one output device, wherein the at least one output device is configured for presenting the report.

16. The system of claim 15, wherein the storing of the report comprises storing the report in a distributed ledger.

17. The system of claim 10, wherein the processing device is further configured for analyzing the at least one information associated with the at least one CAEV using at least one machine learning model, wherein the identifying of the at least one operation is further based on the analyzing.

18. The system of claim 10, wherein the status comprises a scan status of each of the plurality of ECUs.

* * * * *